(12) United States Patent
Singh et al.

(10) Patent No.: US 10,577,920 B2
(45) Date of Patent: Mar. 3, 2020

(54) SENSOR

(71) Applicant: QINETIQ LIMITED, Farnborough, Hampshire (GB)

(72) Inventors: Rajinder Singh, Farnborough (GB); Michael William Hopkins, Farnborough (GB)

(73) Assignee: QINETIQ LIMITED (GB)

( * ) Notice: Subject to any disclaimer, the term of this patent is extended or adjusted under 35 U.S.C. 154(b) by 83 days.

(21) Appl. No.: 15/776,531

(22) PCT Filed: Dec. 1, 2016

(86) PCT No.: PCT/EP2016/079491
§ 371 (c)(1),
(2) Date: May 16, 2018

(87) PCT Pub. No.: WO2017/093430
PCT Pub. Date: Jun. 8, 2017

(65) Prior Publication Data
US 2018/0340412 A1   Nov. 29, 2018

(30) Foreign Application Priority Data
Dec. 2, 2015   (GB) .................. 1521282.2

(51) Int. Cl.
*E21B 47/06*   (2012.01)
*G01V 3/28*   (2006.01)
*E21B 33/14*   (2006.01)

(52) U.S. Cl.
CPC ............ *E21B 47/06* (2013.01); *E21B 47/065* (2013.01); *G01V 3/28* (2013.01); *E21B 33/14* (2013.01)

(58) Field of Classification Search
CPC ..... G01N 27/904; G01N 27/902; F16L 55/38; F16L 55/40; F16L 2101/30
(Continued)

(56) References Cited

U.S. PATENT DOCUMENTS 2,948,842 A    8/1960   Ditto
4,375,164 A    3/1983   Dodge et al.
(Continued)

FOREIGN PATENT DOCUMENTS

DE    3635787    3/1988

*Primary Examiner* — Giovanni Astacio-Oquendo
(74) *Attorney, Agent, or Firm* — McDonnell Boehnen Hulbert & Berghoff LLP

(57) ABSTRACT

A sensor system for the measurement of a physical parameter, such as temperature or pressure comprises a first, fixed module (5), and a second module (20) positionable proximate to the first. The first module has a measurement coil (6) and a reference coil (7), where the measurement coil forms part of an electrical circuit that is subject to variation by the physical parameter, and the reference coil forms part of a circuit not subject to the physical parameter being measured. The second module has a pair of reading coils (22, 23), each arranged to couple to respective measurement and reference coils, where the reading coils are connectable to signal generation and measurement equipment, and the system is arranged to measure electrical characteristics of the measurement and reference coils via the coupling. It has particular utility in harsh environments such as in wells, where the first module may be fixed, and the second module may be lowered adjacent the first. Measurements from the reference coil may be used to calibrate the measurements from the measurement coil. Further coils may be used to aid alignment of the two modules.

24 Claims, 3 Drawing Sheets

(58) Field of Classification Search
USPC ....... 324/339, 242, 244, 243, 240, 239, 228, 324/200
See application file for complete search history.

(56) References Cited

U.S. PATENT DOCUMENTS

| | | |
|---|---|---|
| 5,270,538 A | 12/1993 | Vali et al. |
| 9,991,716 B2* | 6/2018 | Cutright ............... G05B 19/048 |
| 9,992,855 B2* | 6/2018 | Larroux ................... H05G 1/58 |
| 2004/0238166 A1 | 12/2004 | Salamitou et al. |
| 2012/0017673 A1 | 1/2012 | Godager |
| 2014/0226210 A1 | 9/2014 | Godager |
| 2017/0319097 A1* | 11/2017 | Amthor .................. A61B 5/055 |

* cited by examiner

SENSOR

FIELD OF THE INVENTION

This invention relates to sensors for measuring physical characteristics such as pressure or temperature. More particularly, it relates to sensors that measure such characteristics in hard to access and inhospitable locations such as within an oil or gas well.

BACKGROUND OF THE INVENTION

When drilling for oil or gas, either in an exploratory well, or in a production well, it is often desirable to be aware of various physical characteristics of the geology surrounding a wellbore. For example, it is often helpful to be able to measure the temperature and/or pressure that exists at differing depths or distances along the wellbore.

A wellbore typically comprises of a hole drilled into the earth, into which is inserted a metal sectional tube, pipe, or casing etc., the resulting gap between the outside of the casing and the underlying geology (typically rock) being generally filled with a cement mixture which acts to restrict fluid movement and also acts as a bondline between the metal section tube and the surrounding geology.

One way of measuring the temperature and/or pressure within a well is to insert, into the gap between the metal casing and the rock (before the gap is infilled as explained above), a string having electrical sensors thereon that are connected with an electrical cable to the surface. This is relatively simple, but has significant disadvantages. Firstly, it requires the electrical connection running the length of the pipe (from the surface to the lowermost sensor), which can become broken, and so lead to disconnection of some or all of the sensors. Secondly, it is often undesirable to take this approach due to the potential influence that running a cable along the well bondline could have on the integrity of the well.

SUMMARY OF THE INVENTION

It is an object of the present invention to provide an alternative to the known methods of measuring physical characteristics in the environment surrounding or within a wellbore.

According to a first aspect of the present invention there is provided a system for the measurement of a physical parameter, the system comprising a first module fixable within the environment subject to the physical parameter, and a second module that is positionable proximate to the first module,
  wherein the first module comprises a measurement coil and a reference coil, and
  wherein the measurement coil forms part of an electrical circuit, and the measurement coil, or a component electrically connected thereto, is subject to the environment in a manner wherein the electrical circuit varies according to the physical parameter to be measured,
  and further wherein the reference coil forms part of an electrical circuit in which the coil and associated components are not subject to deliberate environmental variation;
  and wherein the second module comprises of a pair of reading coils each arranged in use to inductively couple to respective measurement and reference coils, wherein the reading coils are connectable to signal generation and measurement equipment,
  wherein the system is arranged to measure electrical characteristics of the measurement and reference coils via the inductive coupling.

Embodiments of the invention therefore provide a means for measuring a physical parameter, such as temperature or pressure, in situations such as down a wellbore, or in other hostile environments, that avoids the need for a power supply cable to be permanently installed to provide power to a measurement sensor.

As will be appreciated, the first module can be separated by a distance from the second, by a degree dependent upon the strength of magnetic fields generated and sensitivity of the reading coils and associated equipment. This also allows a measurement to be taken where physical barriers separate the first and second modules. Embodiments of the invention therefore allow the first module to be located e.g. at an outside of a wellbore where it is subject to the geology of the surrounding environment, and for the second module to be inserted inside the wellbore to a position whereby the reading coils align with the measurement and reference coils, and for measurements to be taken. The module may be attached to the wellbore itself, or may lie adjacent the wellbore.

It is understood that the wellbore pipe can create losses that reduce inductive coupling between coils lying either side of it. However, it has been found that under many circumstances these losses are acceptable and do not prevent a meaningful measurement from being made. Also, techniques may be used to increase the strength of the received measurement signal, such as by increasing current flow in the reading coil, or by increasing the number of turns, or physical orientation or shape of the respective coils.

In some embodiments the measurement coil may be mechanically connected to a pressure sensitive device, such that changes in pressure acting upon the pressure sensitive device alter an electrical characteristic of the coil. The pressure sensitive device may comprise e.g. a bellows, lever, hydraulic or spring arrangement that is arranged to be subjected to environmental pressure. The pressure may be a fluid pressure, such as a liquid or gas pressure within the rock, or may be from a solid, such as the rock itself. It will be appreciated that a suitable choice and arrangement of a pressure sensitive device can be made to determine what pressure characteristic is made. The pressure sensitive device may be arranged to connect to the coil, such that movement of the pressure sensitive device caused by changes in environmental pressure may act to change the inductance of the coil. Conveniently, the pressure sensitive device may be connected to the core of the measurement coil, such that changes in pressure act to move the core. By moving the core within the coil, the effective inductance of the coil can be altered. This can be detected by the associated read coil as a change in the mutual inductance between the read coil and measurement coil. Thus, the effective inductance of the read coil will vary depending upon the pressure acting upon the pressure sensitive device. Of course, other embodiments may be attached to the coil, so as to move the coil relative to its core, with similar effect.

Alternatively, the pressure sensitive device may be connected to the electrical circuit so as to change another electrical parameter of the circuit. For example, it may be connected to as to alter a resistance or capacitance in the circuit with changing pressure. An embodiment may, for example, incorporate a pressure sensitive device that acts upon a strain sensitive resistance wire, such as a strain gauge, that is in circuit with the measurement inductor, such that the resistance of the wire changes according to the pressure acting upon the pressure sensitive device.

The presence of the reference coil provides a means for the system to establish whether any long term change is taking place to the module, assuming that any such change affects both the measurement and reference coils equally. The measurement from the reference coil may be used as a calibration tool to normalize measurements taken from the measurement coil circuit.

Advantageously, the measurements taken from the measurement and reference coils, using the reading coils, will comprise complex impedances. Then, the measurement from the reference coil may be subtracted from that of the sensor coil. The remainder should, at a first approximation, allow calculation of the true electrical component values of the measurement coil circuit relative to those of the reference coil circuit.

Preferably, the components making up the reference coil circuit are chosen to have minimal electrical change when subjected to normal changes in their environment, and may comprise precision components.

The measurement made of the reference coil by an appropriate reading coil therefore comprises of a direct measurement of relatively precise components measured through the walls of the pipe. The condition of the pipe and environmental conditions surrounding the coupled inductors will have an effect upon the results. Any variations detected from an expected measurement can therefore be assumed to be due to the condition of the pipe, and other environmental factors (excluding pressure or temperature changes), and these can therefore be calibrated out of measurements made of the measurement coil circuit.

Accordingly, some embodiments of the invention may be arranged to use a measurement from the reference coil to calibrate measurements from the measurement coil.

Some embodiments may provide for the recording of measurements taken from the reference coil circuit to provide long term comparison of such measurements. Any changes in these measurements can be used to provide an indication of changes to the pipe, or to the mounting or positioning of the first module. Advantageously therefore, the reference coil may be made to be electrically similar to the measurement coil. It may, for example, comprise an identical coil, but without having any mechanical coupling to a pressure or other sensor. Similarly, the circuit making up the reference coil may comprise of components of generally similar electrical value to those making up the measurement coil circuit, although of course they will not be subject to such deliberate environmental variation.

To best exploit the similarity of the reference and measurement coils, it is preferable that the coils are mounted on a common axis. It is also preferable that the coils within the second module are maintained on a common axis that, when a measurement is taking place, is parallel to that of the first module.

Advantageously, each of the first and second modules further incorporates an alignment means to aid alignment of the second module to the first. The alignment means may comprise at least one coil in the first module, and at least one coil in the second module, and means for detecting the proximity of the coil in the first module using a drive signal applied to the coil in the second module.

Advantageously, the alignment means comprises a pair of coils located in the first module and spaced apart on a common axis, with the coils wired in parallel with each other, and further comprising corresponding first and second similarly spaced alignment coils in the second module, the first coil being connected to a signal generator to which a drive signal may be applied, and a second coil connected to a receiver.

This setup allows, when the first and second modules are in approximate proximity to each other, the second module to provide a drive signal to the first alignment coil, thus inductively inducing a signal in one of the first module's alignment coils. This signal is then transferred to the second alignment coil in the first module, due to the electrical connection between them. The magnetic field from this second coil is inductively transferred to the second alignment coil in the second module, from where the signal can be read with the receiver. The second module may have a means for adjusting its position relative to the first module. For example, the second module may be repositionable on a supporting cable using a motor drive. The second module may be adjusted in position based upon the signal strength received from the receiver. The adjustment of the position of the second module may be made to maximize the signal strength at the receiver.

Such an alignment means can be used to achieve a proximity of the second module with respect to the first that is good enough to then allow the reference and measurement coils to be read, using the corresponding read coils. Minor misalignments can be managed by using signals received from the reference coil circuit to calibrate the signals received from the measurement coil circuit. This is because any such misalignment will be present in both the reference and measurement coil readings. Preferably, the alignment means is arranged to provide alignment in the axial direction to within half the length of the measurement coil.

It will be appreciated that, instead of using a pressure sensitive device to effect a change to the electrical circuit in which the measurement coil sits, a temperature sensitive device could be used instead. Thus, in some embodiments the temperature sensitive device could be arranged to move a core of the coil, or to make some other change that effects the inductance thereof, dependent upon the temperature of the environment in which it sits.

In this manner the system may be used to measure the temperature of the environment.

In some embodiments of the invention the measurement coil may be connected to a resistor that has a resistance dependent upon its physical temperature, where the resistor forms a circuit with the measurement coil.

Advantageously, the reading coils in the second module may be arranged to connect to a bridge for measuring an inductance value thereof. This allows relatively straightforward and accurate measurement of the inductance values of the reading coil. As the inductance value is affected by the inductance values of the measurement and reference coils, the values measured by the bridge can be used to infer the values of said measurement and reference coils. Preferably a switch is used to switch each reading coil into a single measurement bridge in turn. This removes any need to maintain two separate bridges, with the consequent comparative calibration that that would require.

The inferred component values may then be used, to infer a value for the physical parameter being measured, using predetermined look-up tables or calibration curves, etc.

To minimize or reduce the chances of one coil in the first module deleteriously affecting another, it is preferable that the coils within the first module are separated from each other by a distance such that a magnetic field emanating from one coil has no significant impact on a neighbouring coil. As the coils within the second module are arranged with a similar spacing to those in the first module, this will also help to reduce any such crosstalk between coils in that module also.

Preferably (but not necessarily), in those embodiments employing one or more alignment coils, the frequency used to communicate between the alignment coils is different from that used to interrogate the measurement and reference coils. The frequency of operation used for the alignment coils may advantageously be chosen to be greater than that used by the measurement and reference coils. Some embodiments may employ a dual frequency approach, where a first, generally higher frequency is used for coarse alignment, and a second, lower frequency used for more precise alignment. The use of a higher frequency for coarse alignment allows a faster response, which is useful when in a "seek mode", i.e. carrying out an initial search for the first module using the second module. The second, lower frequency alignment may be used e.g. by a motor drive positioner during a more precise alignment phase.

In applications where the first module is deployed in a wellbore, then the second module may advantageously be deployed on a string or cable. The module may be arranged to have a motor drive, enabling it to vary its position on the string, as explained above.

According to a second aspect of the present invention there is provided a method of measuring a physical parameter using a system as claimed in any of the system claims, comprising:
  i) installing the first module within an environment subject to the physical parameter;
  ii) aligning the second module with the first, such that the reading coils are able to magnetically interact with the measurement and reference coils;
  iii) measuring an electrical property of each of the reading coils, said measurements including a component due to the electrical properties of the measurement and reference coil circuits of the first module;
  iv) calculating, from the measurements in step iii) the values of components in respective measurement and reference coil circuits;
  v) using predetermined calibration data, inferring a value for the physical parameter being measured.

The predetermined calibration data may comprise a lookup table or one or more calibration curves, or any other source of correctional data.

The method may further comprise measuring the complex impedance of each reading coil.

The method may further comprise the step of using at least one alignment coil in each module to aid the positioning of the second module with respect to the first. Advantageously, this may comprise providing a pair of alignment coils in the second module, providing a correspondingly positioned pair of alignment coils in the first module, that are connected together in a circuit, and applying a drive signal to a first alignment coil in the second module, and detecting a signal in the second alignment coil in the second module. When the alignment coils in the first module are proximate to those of the second module, the drive signal will pass between the modules by inductive coupling, with the signal strength received being an indication of how closely aligned the modules are. A motor drive may be used to adjust the position of the second module with respect to the first, to maximize the signal received at the second alignment coil.

DESCRIPTION OF THE DRAWINGS

The invention will now be described in more detail, by way of example only, with reference to the following Figures, of which.

DESCRIPTION OF THE INVENTION

Figure 1:
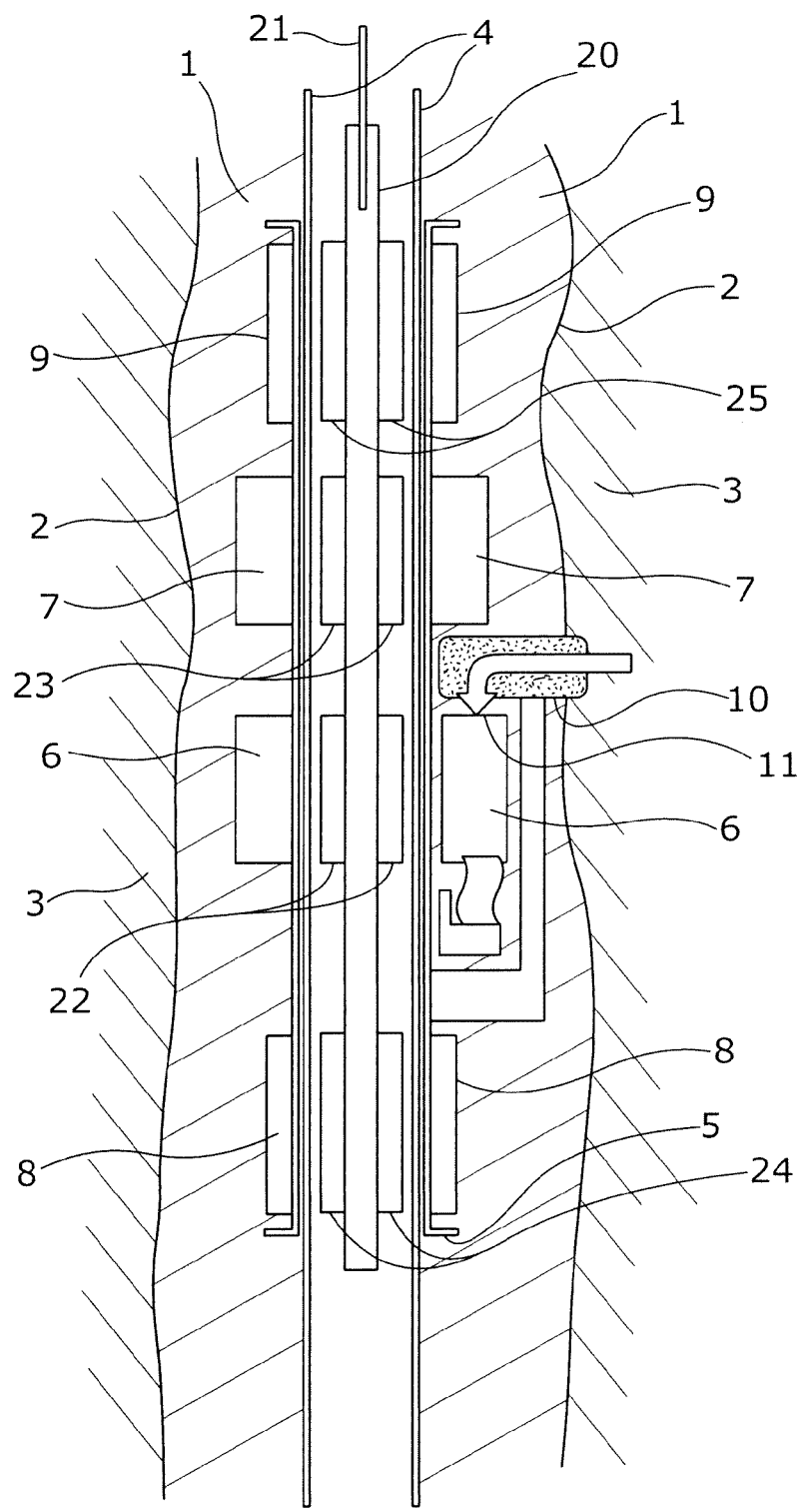
FIG. 1 shows a block diagram of a system according to an embodiment of the invention, being deployed in a wellbore.

FIG. 1 shows a physical arrangement of the key components of an embodiment of the invention, and how they may be deployed in a wellbore. The Figure is a sectional profile view through the wellbore.

A wellbore 1, having walls 2 has been drilled into rock 3. A metal pipe or casing 4 is positioned within the wellbore 1. In the gap between the outside of the pipe 4 and the walls 2 a first module 5 is positioned, typically when installing pipe 4. The module 5 comprises, inter alia, a measurement coil 6, a reference coil 7, and a pair of alignment coils 8, 9. The coils 6, 7, 8 and 9 are all wound around the pipe 4. A mechanical pressure sensor 10 has an input that is subject to pressure variations within the rock 3, and converts these pressure variations to movement of its output shaft 11. The output shaft is connected to a the measurement coil 6, such that movement of the shaft 11 results in movement of the coil 6 axially along the pipe 4.

The measurement and reference coils each comprise of typically several hundred, up to several thousand turns of copper wire. Each is in a circuit with a load component comprising a resistor of around 100 Ohms, although it will be appreciated that this value is not limiting, and that other values may be used.

A second module 20 is introduced inside the pipe 4 on a cable 21. The module 20 has four coils, each corresponding in position to one of the coils 6, 7, 8, 9 of the first module. A measurement reading coil 22 is arranged, in use, to sit within the measurement coil 6, and in similar fashion a reference reading coil 23 and a pair of alignment coils 24, 25 sit within corresponding coils 7, 8, 9 of the first module.

Figure 2:
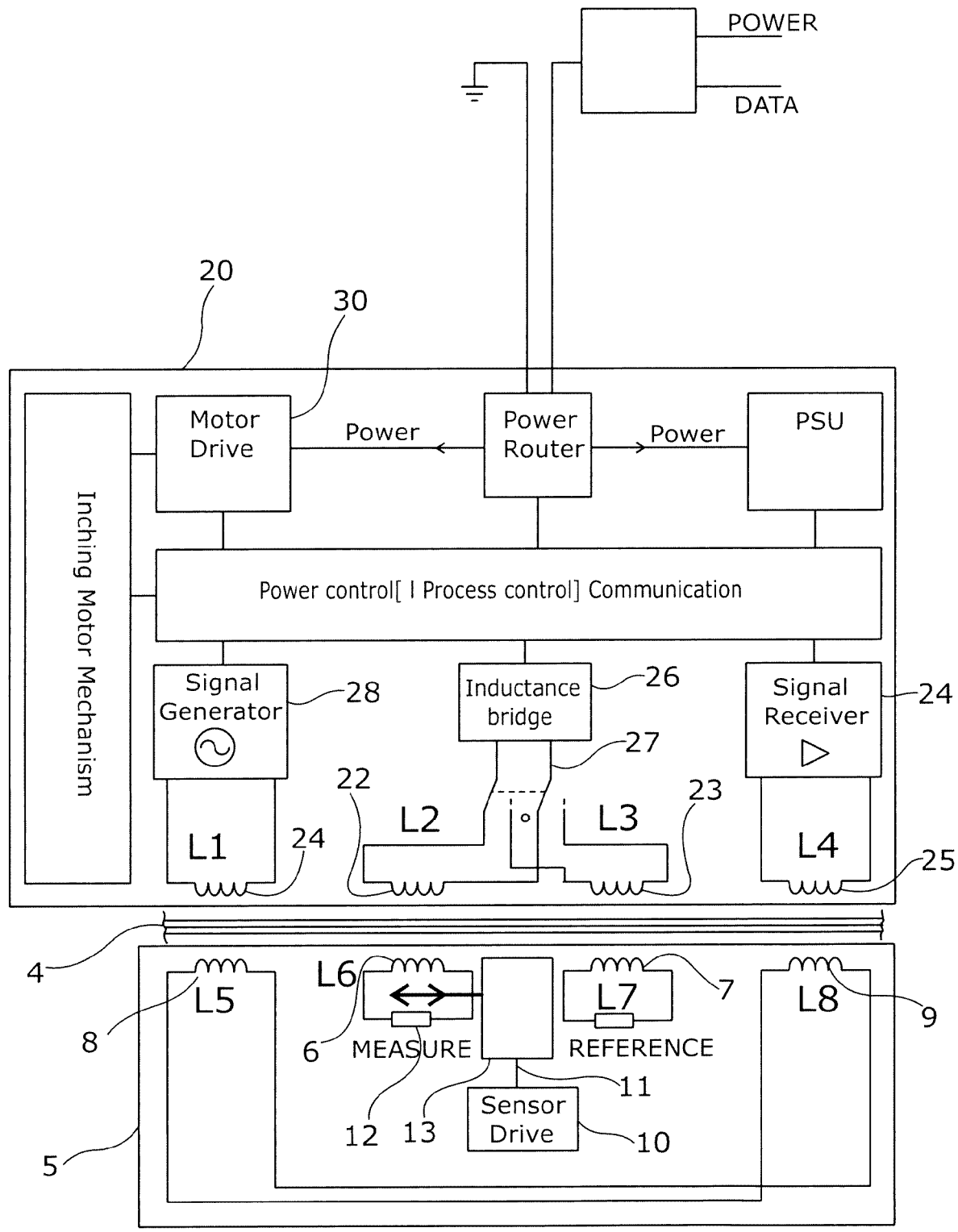
FIG. 2 shows a block diagram of a system according to one embodiment of the invention.

FIG. 2 shows in greater detail a block diagram of operational aspects of the embodiment shown in FIG. 1. The first module 5 contains measurement coil 6, reference coil 7, and alignment coils 8, 9. The measurement coil forms a circuit with a resistor of around 100 Ohms, as stated above. Similarly, the reference coil is in series with a resistor of a similar value. The alignment coils 8, 9 are coupled together, so that any currents induced in one coil also flow through the other. The measurement coil is attached by suitable mechanical (including, in some embodiments, hydraulic) coupling 13 to an output shaft 11 of a pressures sensor 10.

Second module 20 contains coils 22, 23, 24 and 25 as described in relation to FIG. 1. An inductance bridge 26 has an input from switch 27, which is able to switch into the bridge either the measurement reading coil 22 or reference reading coil 23. A signal generator 28 is connected to alignment coil 24, while a receiver is connected to alignment coil 25. The receiver is arranged to provide as an output a signal indicative of the strength of the signal of the same frequency as that generated by the signal generator 28.

Note that in some embodiments the resistor in series with the measurement coil may be a thermistor, arranged to vary in value according to temperature. It may have a range of values from around 100 Ohms at 25° C., up to around 1 kOhm at 250° C., but other ranges and values may be employed in other embodiments. Other embodiments may employ a strain gauge in place of the thermistor.

An alignment phase will now be described. During an initial alignment phase, the second module is lowered down inside the pipe 4. The alignment coils are activated during this phase in a high frequency mode, that provides a quicker response from the receiver 29. Signal generator 28 produces a signal, and signal receiver 29 listens out for this signal. As the second module descends, it will at some point align itself such that alignment coil 24 is within the vicinity of alignment coil 8 in the first module. This will induce currents into coil 8, which then flow into coil 9. The resulting magnetic field from coil 9 induces currents into alignment coil 25, which are detected by the receiver 25. The lowering process is then halted. A fine tuning of position is then carried out, with the signal generator 28 switched to a lower operating frequency, with a signal strength measurement from receiver 28 being used to control a worm drive unit 30 that provides fine axial position control of the second module.

Once the modules are aligned as described above, measurements from the measurement and reference coils can now be taken. As the pressure sensed by pressure sensor 10 varies, the coil 6 moves axially along the pipe 4, and hence moves relative to its associated reading coil 22. The mutual inductance between the two therefore varies with this pressure, which is detectable by inductance bridge 26.

Switch 27 first switched to the reference reading coil, and the inductance bridge takes a measurement of complex signals from the reference reading coil. Then, the switch 27 is switched to record measurements from the measurement reading coil 22. These reading are then used to infer, using look-up tables or calibration curves, values for the mutual inductance of the measurement coil and its associated reading coil, and hence, from predetermined information relating component values to physical environmental conditions, values for the pressure sensed by pressure sensor 10. Other embodiments may employ a temperature sensor in place of the pressure sensor 10, in which case the result will be a temperature reading.

In embodiments employing a thermistor as a component in the measurement coil circuit, the measurements obtained from the inductance bridge may be processed to measure phase and amplitude, and from this to infer values for each component. In such embodiments, a single measurement coil circuit in the first module may be used to provide an indication of both temperature and pressure. Other embodiments may employ multiple independent measurement coil circuits, and have corresponding measurement reading coils in the second module, with each measurement coil circuit being arranged to measure a single environmental parameter.

Figure 3:
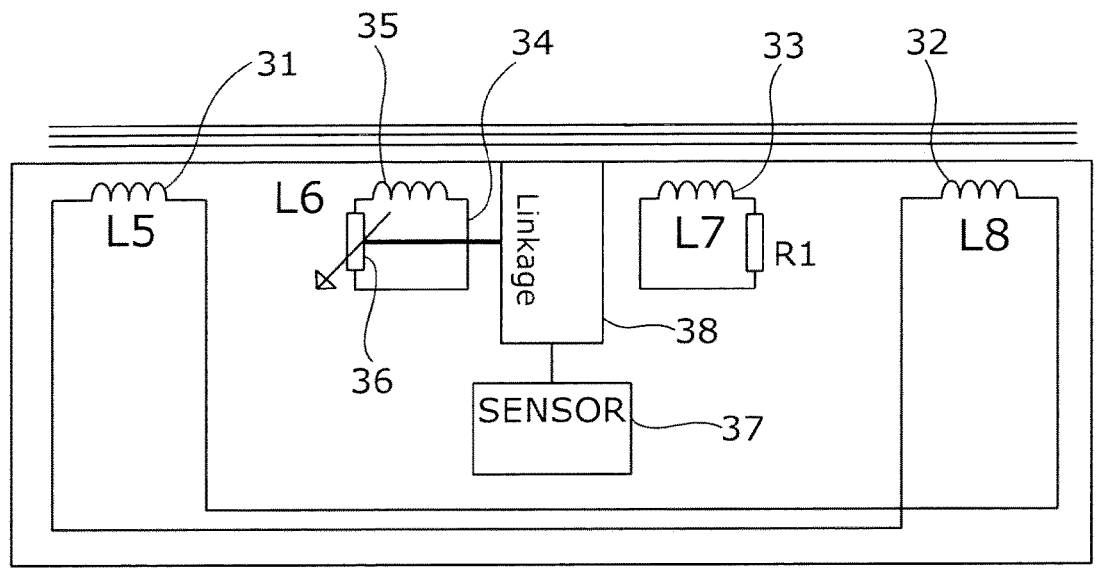
FIG. 3 shows an alternative arrangement for a first module of a sensor system according to an embodiment of the present invention.

FIG. 3 shows an alternative arrangement for the measurement circuit within the first module. Note that only the first module is shown, as the second module is substantially or identically similar to that shown in relation to FIG. 2. Here, a first module 30 comprises alignment coils 31, 32 as before, and also a reference coil circuit 33 as previously explained. The measurement coil circuit 34 comprises a measurement coil 35 and a variable component 36 connected electrically in series the measurement coil 35. The variable component is mechanically connected via linkage 38 to a sensor 37, which may be a pressure sensor or temperature sensor. The mechanical connection therefore varies an electrical property of the component 36 according to the environmental conditions upon the sensor. Note that the measurement coil 35 remains substantially unchanged during any environmental changes acting upon the sensor 37. Readout of this embodiment is done in similar fashion to that described in relation to the embodiment shown in FIG. 2. However, the measurement coil 35 remains fixed in position with respect to its associated readout coil, and so a more reliable interaction between the two is achieved.

Figure 4:
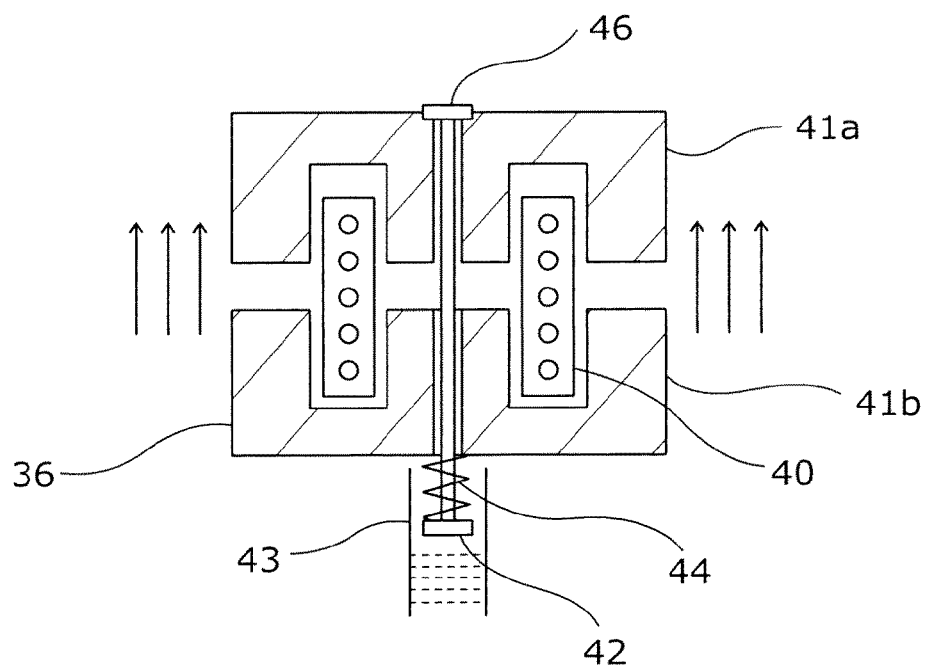
FIG. 4 shows a measurement coil component as may be used in an embodiment of the present invention.

FIG. 4 shows an example of a component that may be used as the variable component 36. This comprises a second coil 40 mounted in a pair of ferrite RM cores 41a,b The cores 41a,b are joined by a centre pin 46 which is fixed to distal core 41a, and slidably attached to proximal core 41b. The centre pin 46 attaches to a piston 42 which is surrounded by a barrel 43 that is attached to proximal core 41b. Thus, movement of the piston 42 relative to the barrel 43 causes the respective cores 41a, 41b to move relative to each other. The relative position of the cores affects the effective value of the inductance of coil 40. A return spring 44 acts to bias the cores 41a,b together in conditions of zero force upon piston 42.

Thus, the component is a variable inductance, that varies according to the pressure put upon piston 42. The pressure upon piston 42 may be derived from a fluid or solid pressure being measured, or may derive from a further temperature sensor that is arranged to move the piston according to the temperature of the environment.

Alternatively, the variable component may comprise a variable resistor, such as a thermistor or strain gauge, that changes its value according to temperature or force respectively. Such variations in resistance value can be detected by changes to the phases and/or amplitudes measured in the inductance bridge of the second module.

It will be apparent to a normally skilled person that other components and circuits may be used in the measurement coil circuit to give an indication of an environmental parameter of interest. For example, a capacitive component may be used as well, or instead of, an inductive or resistive component.

The invention claimed is:

1. A system for the measurement of a physical parameter, the system comprising a first module fixable within the environment subject to the physical parameter, and a second module that is positionable proximate to the first module,
   wherein the first module comprises a measurement coil and a reference coil, and
   wherein the measurement coil forms part of an electrical circuit, and the measurement coil, or a component electrically connected thereto, is subject to the environment in a manner wherein the electrical circuit varies according to the physical parameter to be measured,
   and further wherein the reference coil forms part of an electrical circuit in which the coil and associated components are not subject to deliberate environmental variation;
   and wherein the second module comprises of a pair of reading coils each arranged in use to inductively couple to respective measurement and reference coils, wherein the reading coils are connectable to signal generation and measurement equipment,
   wherein the system is arranged to measure electrical characteristics of the measurement and reference coils via the inductive coupling.

2. The system as claimed in claim 1 wherein the first module is affixed to an outside of a wellbore, pipe, tube or casing.

3. A system as claimed in claim 1 wherein the electrical circuit of the measurement coil includes the mutual inductance between it and a reading coil within the second module.

4. A system as claimed in claim 1 further comprising a device sensitive to an environmental characteristic, said device being connected to a component in the measurement coil circuit, such that changes in the environmental characteristic acting upon the device alter an electrical characteristic of the component.

5. A system as claimed in claim 3 wherein the electrical characteristic altered is a mutual inductance between the measurement coil and the associated reading coil within the second module.

6. A system as claimed in claim 2 wherein the electrical characteristic altered is a mutual inductance between the measurement coil and the associated reading coil within the second module and wherein the device is a mechanical device, and is arranged to move the measurement coil, or an associated core, along the axis of the pipe, tube or casing.

7. A system as claimed in claim 4 wherein the device is mechanically connected to a second coil in series with the measurement coil, such that changes in the environmental characteristic act to provide a relative movement between the second coil and its core.

8. A system as claimed in claim 4 wherein the device is sensitive to changes in pressure.

9. A system as claimed in claim 4 wherein the device is sensitive to changes in temperature.

10. A system as claimed in claim 1 wherein the reference coil circuit is arranged to be electrically broadly similar to the measurement coil circuit, but to substantially not change its component values with changes to the environment.

11. A system as claimed in claim 1 wherein the measurement and reference coils are aligned on a common axis.

12. A system as claimed in claim 1 wherein the measurement coil is connected to a resistor that has a resistance dependent upon its physical temperature.

13. A system as claimed claim 1 wherein the system further comprises an alignment means, the alignment means comprising at least one coil in the first module, and at least one coil in the second module, and means for detecting the proximity of the coil in the first module using a drive signal applied to the coil in the second module.

14. A system as claimed in claim 13 wherein the alignment means comprises of a pair of coils located in the first module and spaced apart on a common axis that are wired in parallel with each other, and further comprising corresponding first and second similarly spaced alignment coils in the second module, the first coil being connected to a signal generator to which a drive signal may be applied, and a second coil connected to a receiver.

15. A system as claimed in claim 1 wherein the reading coils in the second module are arranged to connect to a bridge for measuring an inductance value thereof.

16. A system as claimed in claim 15 wherein the system further includes a switch for alternately switching each of the reading coils into the bridge in turn.

17. A system as claimed in claim 1 wherein a complex impedance of the measurement coil circuit is measured by its associated reading coil.

18. A system as claimed in claim 1 wherein the coils within the first module are separated from each other by a distance such that a magnetic field emanating from one coil has no significant impact on a neighbouring coil.

19. A system as claimed in claim 1 wherein the second module is attached to a string or cable suitable for lowering into a wellbore.

20. A system as claimed in claim 1 wherein the second module is affixed to an inside part of a casing adjacent to the first module.

21. A system as claimed in claim 1 wherein at least two measurement coil circuits are used, each configured to measure a different physical parameter.

22. A system as claimed in claim 1 wherein the system is arranged to use a measurement from the reference coil to calibrate measurements from the measurement coil.

23. A method of measuring a physical parameter using a system as claimed in claim 1, comprising:
   i) installing the first module within an environment subject to the physical parameter;
   ii) aligning the second module with the first, such that the reading coils are able to magnetically interact with the measurement and reference coils;
   iii) measuring an electrical property of each of the reading coils, said measurements including a component due to the electrical properties of the measurement and reference coil circuits of the first module;
   iv) calculating, from the measurements in step iii) the values of components in respective measurement and reference coil circuits;
   v) using predetermined calibration data, inferring a value for the physical parameter being measured.

24. The method as claimed in claim 23 wherein the electrical property measured is the complex impedance of each reading coil.

* * * * *